United States Patent
Kinarti et al.

(10) Patent No.: US 11,747,889 B2
(45) Date of Patent: *Sep. 5, 2023

(54) CUSTOMIZED INTERNET-OF-THINGS DATA PACKAGING AND BROKERING

(71) Applicant: SAP Portals Israel Ltd., Ra'Anana (IL)

(72) Inventors: Barak Kinarti, Kfar Saba (IL); Eyal Nathan, Reut (IL); Ido Fishler, Tel Aviv (IL); Marcus Conrad Behrens, Heidelberg (DE); Amir Blich, Raanana (IL)

(73) Assignee: SAP Portals Israel Ltd., Ra'Anna (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,439

(22) Filed: Dec. 10, 2021

(65) Prior Publication Data

US 2022/0100260 A1    Mar. 31, 2022

Related U.S. Application Data

(63) Continuation of application No. 16/685,056, filed on Nov. 15, 2019, now Pat. No. 11,199,897, which is a
(Continued)

(51) Int. Cl.
| | |
|---|---|
| *H04L 67/30* | (2022.01) |
| *H04L 65/75* | (2022.01) |
| *H04L 67/562* | (2022.01) |
| *H04L 67/567* | (2022.01) |
| *G06F 3/00* | (2006.01) |

(Continued)

(52) U.S. Cl.
CPC .................. *G06F 3/00* (2013.01); *G06F 5/00* (2013.01); *H04L 65/612* (2022.05);
(Continued)

(58) Field of Classification Search
CPC . G06F 3/00; G06F 5/00; H04L 65/612; H04L 65/762; H04L 67/30; H04L 67/562; H04L 67/567

See application file for complete search history.

(56) References Cited

U.S. PATENT DOCUMENTS

| | | |
|---|---|---|
| 10,528,120 B2 | 1/2020 | Kinarti et al. |
| 2017/0053032 A1 | 2/2017 | Liongosari et al. |

(Continued)

OTHER PUBLICATIONS

"U.S. Appl. No. 15/378,621, Examiner Interview Summary dated May 13, 2019", 3 pgs.

(Continued)

*Primary Examiner* — Abdulkader M Alriyashi
(74) *Attorney, Agent, or Firm* — SCHWEGMAN LUNDBERG & WOESSNER, P.A.

(57) ABSTRACT

A data-brokerage service that facilitates data sharing between Internet-of-Things (IoT) platforms via peer-to-peer connections is described. In various embodiments, the data-brokerage service receives, from an IoT platform acting as data consumer, a selection of data fields included in a plurality of data streams provided from a plurality of respective IoT platforms acting as data producers. Responsive to the selection, the data-brokerage service causes the plurality of data-producer platforms to stream at least the selected data fields of the plurality of data streams to the data-consumer platform, and causes the data-consumer platform to combine the streamed data fields received from the plurality of data-producer platforms into a single target data stream.

20 Claims, 6 Drawing Sheets

Related U.S. Application Data continuation of application No. 15/378,621, filed on Dec. 14, 2016, now Pat. No. 10,528,120.

(51) Int. Cl.
*G06F 5/00* (2006.01)
*H04L 65/612* (2022.01)

(52) U.S. Cl.
CPC ............ *H04L 65/762* (2022.05); *H04L 67/30* (2013.01); *H04L 67/562* (2022.05); *H04L 67/567* (2022.05)

(56) References Cited

U.S. PATENT DOCUMENTS

| | | |
|---|---|---|
| 2017/0124110 A1 | 5/2017 | Hajj et al. |
| 2017/0177520 A1 | 6/2017 | Kampe et al. |
| 2017/0289253 A1 | 10/2017 | Graefe et al. |
| 2018/0167435 A1 | 6/2018 | Kinarti et al. |
| 2020/0081519 A1 | 3/2020 | Kinarti et al. |

OTHER PUBLICATIONS

"U.S. Appl. No. 15/378,621, Non Final Office Action dated Apr. 3, 2019", 12 pgs.

"U.S. Appl. No. 15/378,621, Notice of Allowance dated Sep. 5, 2019", 16 pgs.

"U.S. Appl. No. 15/378,621, Response filed Jul. 1, 2019 to Non-Final Office Action dated Apr. 3, 2019", 16 pgs.

"U.S. Appl. No. 16/685,056, Non Final Office Action dated Mar. 18, 2021", 6 pgs.

"U.S. Appl. No. 16/685,056, Notice of Allowance dated Aug. 11, 2021", 8 pgs.

"U.S. Appl. No. 16/685,056, Response filed Apr. 9, 2021 to Non Final Office Action dated Mar. 18, 2021", 4 pgs.

CUSTOMIZED INTERNET-OF-THINGS DATA PACKAGING AND BROKERING

CROSS-REFERENCE TO RELATED APPLICATIONS

This application is a continuation of prior application Ser. No. 16/685,056, filed on Nov. 15, 2019, which is a continuation of prior application Ser. No. 15/378,621, filed on Dec. 14, 2016, which applications are incorporated by reference herein in their entirety.

FIELD

The present disclosure relates generally to data sharing between Internet-of-Things (IoT) networks. In particular, various embodiments pertain to a data-brokerage service that facilitates such data sharing.

BACKGROUND

The Internet of Things generates vast amounts of data that are often useful not only to the organization owning or operating the IoT devices generating the data, but also to other organizations. For example, power consumption as measured by one utility company may be of interest to other utility companies, and weather data acquired by a network of meteorology stations may be useful to both utility companies as well as to individuals retrieving local weather data via smartphones. Accordingly, there may be incentives for sharing data between IoT networks acting as data producers and/or data consumers, respectively. Data acquired by one IoT network may, for instance, be streamed to others for an agreed-upon price. To support their use cases, data consumers combine, in many situations, data streams from multiple data producers, but often use only part of the data in the individual data streams. This results in the unnecessary use of bandwidth to transmit data ultimately filtered out by the consumer system, and tends to require significant manual effort to filter and aggregate data across data streams with little to no knowledge of the data's proven quality.

BRIEF DESCRIPTION OF THE DRAWINGS

The present disclosure is illustrated by way of example and not limitation in the accompanying drawings.

DETAILED DESCRIPTION

Described herein are systems, devices, methods, and computer-program products embodied in machine-readable storage media for tailoring shared IoT data to the needs of data consumers by selectively aggregating data across data streams from multiple data producers to create custom data packages. The terms "data producer" and "data consumer" are herein used to designate IoT networks or IoT computing platforms acting in a producer or consumer capacity (that is, as sender or recipient of IoT data), respectively. It is to be understood that an IoT computing platform (herein also, for brevity, "IoT platform") can generally act, at any point in time, as producer and/or consumer; often, an IoT platform assumes both roles simultaneously with respect to different data streams. In accordance with various embodiments, data sharing between IoT computing platforms is facilitated by a data-brokerage service implemented on a server system (hereinafter "data brokerage server") connected to the IoT computing platforms. The data-brokerage service may receive metadata about data streams made available by the data producers and information about data needs of the data consumers, and pair consumers with producers that match their needs. Based on the identified pairings, peer-to-peer (P2P) connections may be established between data producers and data consumers to enable producer-to-consumer data streaming, often in real time. Accordingly, the data-brokerage service assists with initiating the connections between data producers and data consumers, but is disintermediated once the connections are established, in contrast to traditional data-sharing systems where data is centrally stored for retrieval by the consumers. Beneficially, avoiding such centralized storage in accordance with P2P embodiments as described herein renders the system inherently more scalable, as new participants in the data-sharing service bring along additional storage, processing capacity, and bandwidth.

In various embodiments, the data-brokerage service receives, as part of the information about the data needs of a data consumer, selections of individual data fields associated with multiple data streams. In response to such selection, the data-brokerage service causes the respective data producers to selectively send those data fields to the consumer, and the consumer to assemble the data fields of the multiple data streams into a single, customized target data stream. The data-brokerage service may, for example, generate producer and consumer configurations and transmit them to the respective IoT platforms as part of mediating the establishment of P2P connections between them. The configurations may include instructions and/or data enabling the data consumer to map the data fields of the incoming data streams into a unified target data stream, which may involve unit conversions and/or temporal alignments between data streams having different data rates. In some embodiments, the data-brokerage server furthermore stores customer-profile data associated with the organizations owning and/or operating the IoT platforms, and analyzes the customer-profile data in conjunction with the customized target data streams for a large number of IoT platforms to discover correlations between the characteristics and data needs of the organizations; these correlations can then serve to generate recommendations for target data streams to data consumers.

The foregoing will be more readily understood from the following description of various example embodiments, in particular when taken in conjunction with the accompanying drawings.

Figure 1:
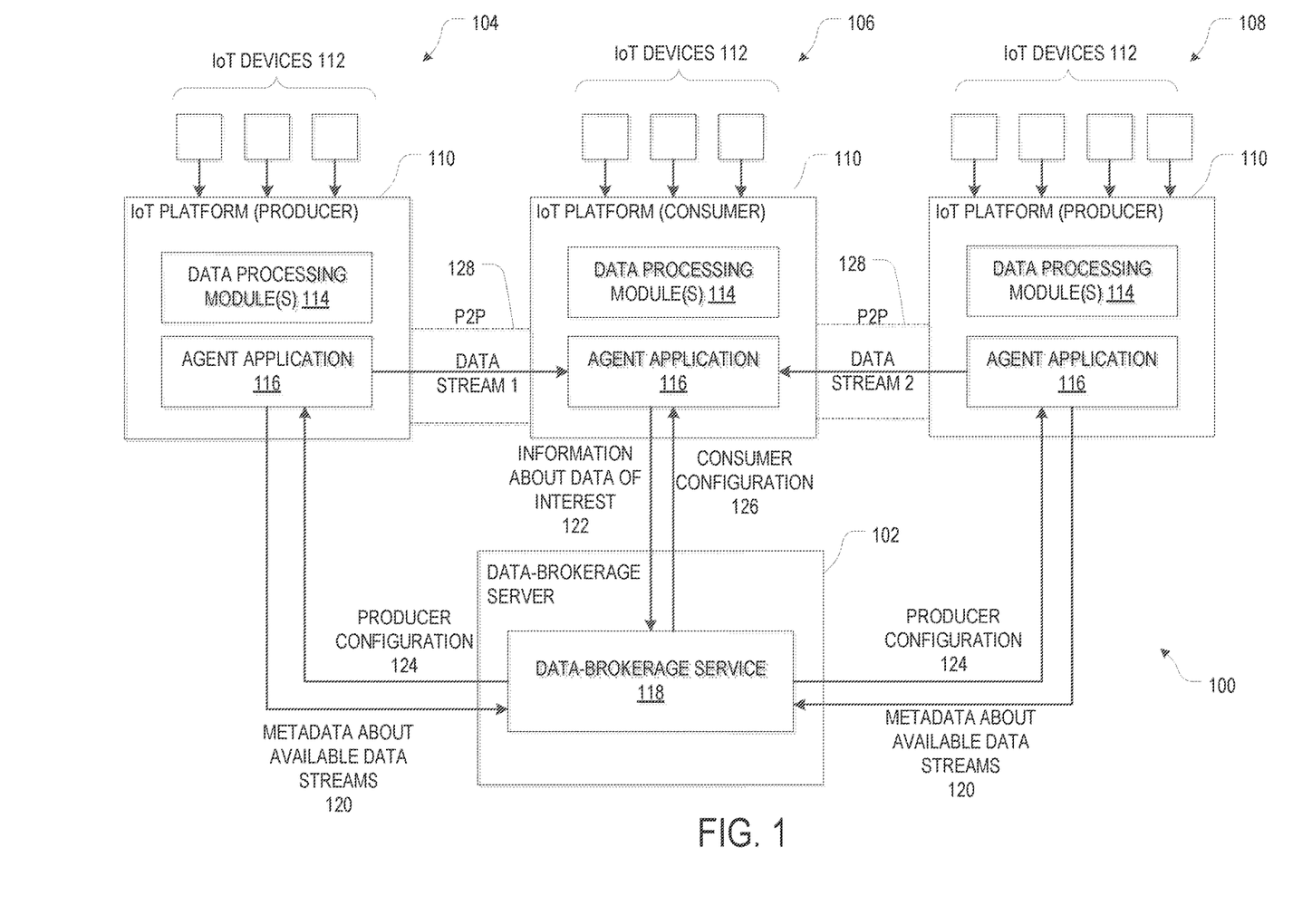
FIG. 1 is a block diagram of an example system for brokering data sharing between data producers and data consumers, in accordance with various embodiments.
Figure 6:
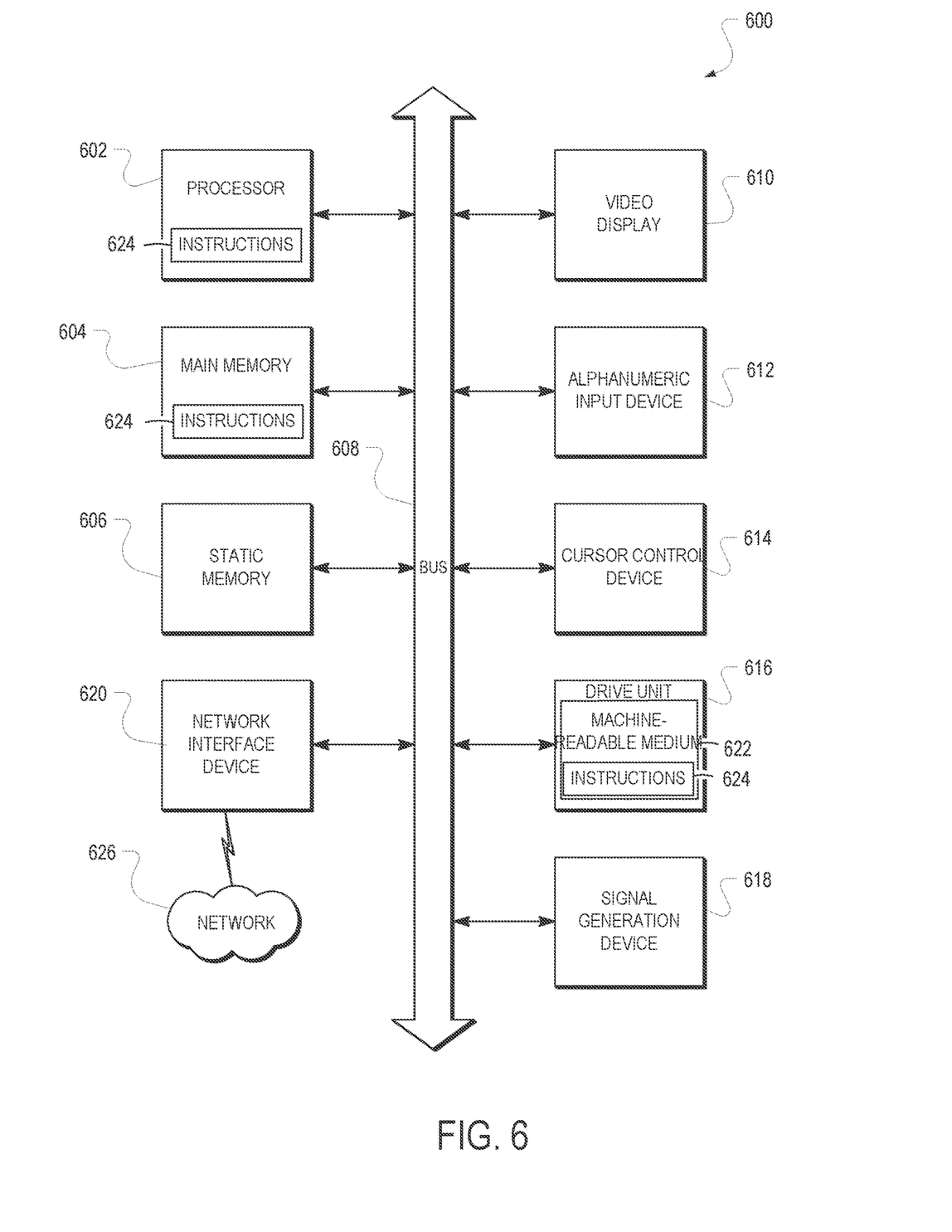
FIG. 6 is a block diagram of a computer processing system within which a set of instructions may be executed for causing a computer to perform any one or more of the methodologies discussed herein.

FIG. 1 is a block diagram of a system 100 for sharing data between data producers and data consumers as brokered by a data-brokerage server 102, in accordance with various embodiments. The system 100 includes a plurality of IoT networks 104, 106, 108, each including an IoT platform 110 that is connected to one or more IoT devices 112 generating data. Examples of IoT devices include, without limitation, stationary or mobile computing devices (e.g., personal computers (PCs), laptops, smartphones, tablets, wearable computing devices), audio and video devices (e.g., televisions, cameras, gaming platforms), environmental sensors and monitoring devices (e.g., temperature sensors, pressure sensors, flow sensors, seismic sensors, etc., and related warning systems), biomedical sensors and monitoring devices (e.g., blood pressure and heart rate monitors), as well as sensors and controllers in vehicles, automated manufacturing systems, building or home automation systems, security systems, transportation systems, energy-management systems, and the like. Each of the IoT platforms 110 may execute one or more data processing modules 114 to process and/or analyze the raw data received from the IoT devices 112 within the respective IoT network. Further, each of the IoT platforms 110 runs an agent application 116 that facilitates data exchange with other IoT platforms 110 as brokered by a data-brokerage service 118 executing on the data-brokerage server 102. The data-brokerage server 102 and the IoT platforms 110 may generally each be implemented by a single computing machine (e.g., a computer as illustrated in FIG. 6) or by multiple machines intercommunicating via a suitable network.

In the example depicted in FIG. 1, the system 100 includes three IoT platforms 110, two of which are designated as data producers and one of which is designated as data consumer. It is to be understood, however, that the system 100 may generally include any number of IoT platforms 110, and that each individual IoT platform 110 may generally act as data producer or data consumer, or serve in both capacities at different times or even simultaneously with respect to different data streams. Accordingly, the agent applications 116 may include the functionalities for both data producers and data consumers (see also FIG. 3 below), and the IoT platforms 110, depending on their momentary operation in one or the other capacity, may utilize different subsets of the functionalities. In some embodiments, the various IoT platforms execute different instances of the same agent application 116. (It is possible, however, that a platform operates only as data producer or only as consumer, and in this case, the agent application on that platform need not include the full functionality for both roles.)

To participate in data sharing, the agent applications 116 register the respective IoT platforms with, or otherwise indicate their presence to, the data-brokerage service 118. Further, for an IoT platform 110 acting as data producer (as depicted, e.g., for IoT networks 104, 108), the agent application 116 transmits metadata 120 about the available data streams to the data-brokerage service 118. That metadata may include, e.g., the types of data and associated units, data rates, information about the IoT devices collecting the data (such as, e.g., their locations, manufacturers, model and serial numbers, measurement accuracies), and any relevant pricing information if the data is available for purchase. Similarly, for an IoT platform 110 acting as data consumer (as depicted, e.g., for IoT network 106), the agent application 116 transmits information 122 about the data of interest, such as the types of data and the (geographically or otherwise defined) locations where the data is being collected. In some embodiments, this information is solicited by the data-brokerage service 118 via a web interface. Based on the information received from the data producer(s) and data consumer(s), the data-brokerage service 118 can identify lists (2 or more) of a data consumer and a data producer matching (at least partially) the data consumer's interest. In some embodiments, a user of the data-consumer IoT platform is presented with information about one or more such matching data streams (e.g., the associated metadata or a portion thereof). The user may then select which data streams, or which individual data fields within one or more data streams by one or more data producers, the data consumer is to receive. In some embodiments, the information about data streams presented by the data-brokerage service 118 includes a combination of data fields, generally across multiple data streams, that is recommended by the data-brokerage service based on a profile (e.g., specifying an industry, geographic location, etc.) of the data consumer or the rated quality.

Upon receipt, from the agent application 116 of the data consumer, of a selection of data streams and/or data fields to which the data consumer wishes to subscribe, the data-brokerage service 118 takes steps causing the data consumer to connect with each of the selected data producers. In accordance with various embodiments, the data-brokerage service 118 generates and transmits, for each of the selected data producers, a producer configuration 124 identifying the data consumer and specifying the selected data fields of the data stream provided by the data producer. Producer configurations 124 are usually communicated to the respective data producers for individual data consumers, but may also be aggregated across data consumers subscribing to the same data streams if this can be done without unacceptable time delays in establishing connections between data consumers and data producers. In addition to the producer configurations 124, the data-brokerage service 118 further generates and transmits a consumer configuration 126 that identifies the data producers that are to stream data to the data consumer, and specifies how the streamed data is to be mapped into a single target data stream.

To cause a given pair of data consumer and data producer to connect and begin data transfer, the data-brokerage service 118 may generate a security token (or set of related tokens) and send it to the IoT platforms 110 of the data producer and the data consumer, along with the network addresses of the respective other IoT platform. Using the network addresses and security token (or set of tokens), the agent applications 116 executing on the data-consumer and data-producer IoT platforms can then establish a P2P connection 128 between them (e.g., with a secure handshake). Depending on the preferences of the data consumer and data producer, the P2P connection can be initiated by either one of them. In some embodiments, the security token is set to expire after a certain time period, and updated security tokens are sent periodically to data consumer and data producer to reestablish the connection. Further, in some embodiments, prior to sending security tokens, the data-brokerage service 118 exchanges communications with the data consumer and data producer to confirm agreement between them and/or with the data-brokerage service 118 on the terms of the data sharing, such as on any price to be paid by the data consumer in exchange for the data and/or any commission to be paid to the data-brokerage service 118. The data-brokerage service 118 may also obtain confirmation that payment to the data producer was actually received.

Once a P2P connection 128 is established between a data producer and a data consumer, the data producer sends data to the data consumer in accordance with the producer configuration (e.g., after filtering the default data stream provided by the data producer to transmit only the data fields selected by the data consumer). The data consumer may, as shown in FIG. 1, receive data streams from multiple data producers. Based on the consumer configuration, the agent application 116 executing on the data-consumer IoT platform can combine the individual received data streams into a single target data stream for further use by the IoT platform.

Figure 2:
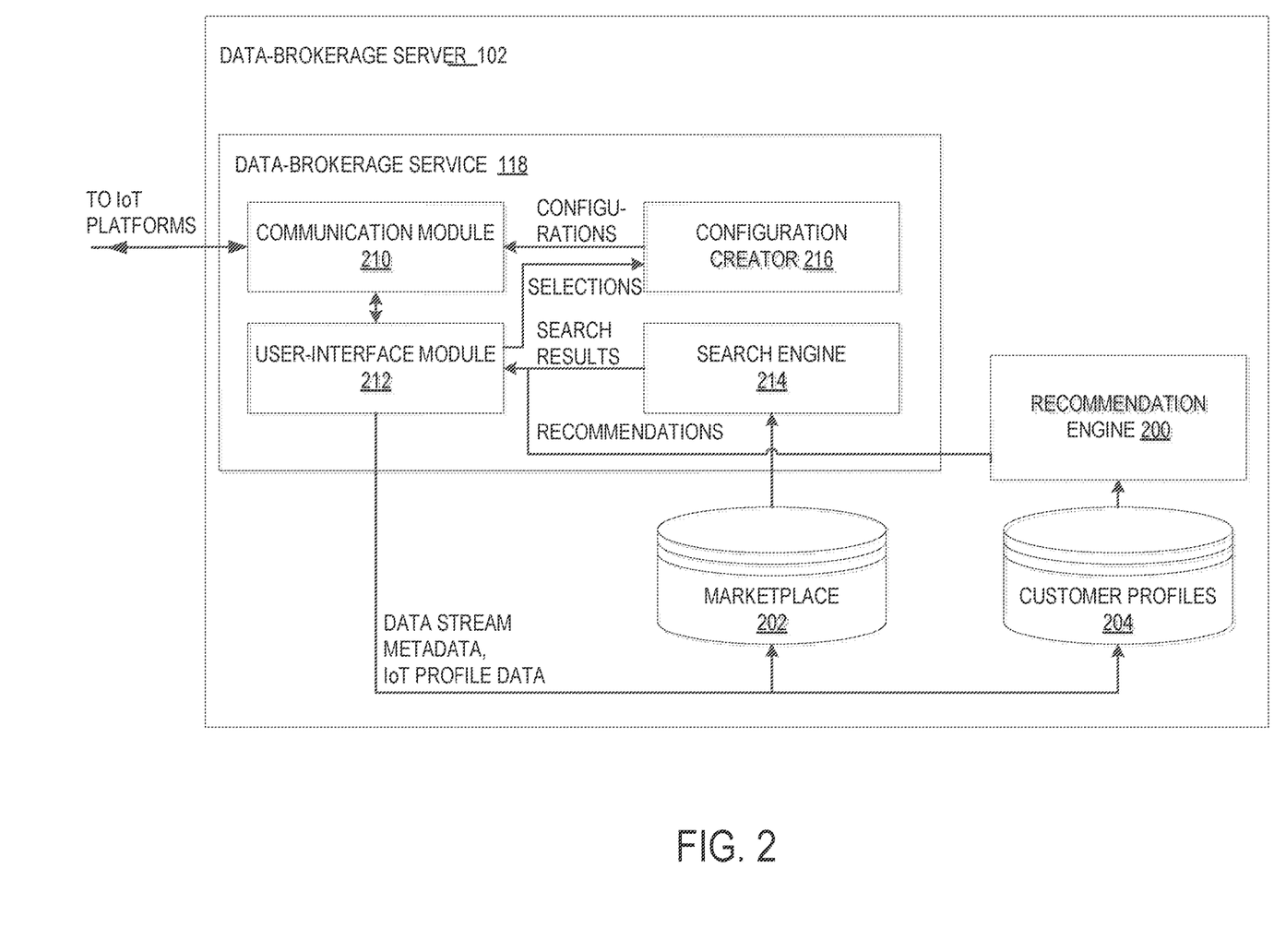
FIG. 2 is a block diagram of a data-brokerage server in accordance with an example embodiment.

FIG. 2 is a block diagram illustrating, in more detail, a data-brokerage server 102 in accordance with an example embodiment. The data-brokerage server 102, which may be implemented by one or more computers, includes the data-brokerage service 118, a recommendation engine 200, a marketplace repository 202, and a customer profile repository 204. The data-brokerage service 118 and recommendation engine 200 are computational modules implemented by a suitable combination of hardware and/or software, such as by one or more computer processors executing program code stored in memory. The marketplace repository 202 and customer profile repository 204 are implemented in permanent data storage devices, and may be organized, e.g., as databases, hashs, or file repositories. The data-brokerage server 102 includes a network interface (or multiple such interfaces on multiple computers collectively constituting the data-brokerage server 102) for communicating with the IoT platforms.

The marketplace repository 202 stores metadata about the available data streams, such as identifying information of the respective data producer (e.g., network address and the name of the company or organization), a name and/or general description of the data stream (such as, e.g., "weather data"), the general type of data (e.g., whether it is time-series data acquired at a fixed data update rate or event data), a list of the data fields included in the data stream (including for each field, for example, a name of the quantity measured (e.g., temperature) and the corresponding units (e.g., degrees Fahrenheit or degrees Celsius)), data rates (e.g., one data sample per minute) or other availability information (including, e.g., indications of time periods during which data is unavailable or acquired at a reduced rate), locational information (e.g., descriptors of cities, countries, or geographic regions for which the data is acquired; or coordinates or addresses associated with the IoT device locations), and pricing information (e.g., a minimum or fixed price per amount of data or periodic subscription fee). The marketplace repository 202 may further store metadata about the data streams of interest to consumers, including identifying information of the respective data consumer (e.g., network address and the name of the company or organization), a list of the data fields of interest, indications of desired data rates, rated quality of the data, and pricing information (e.g., a maximum price the data consumer is willing to pay). In some embodiments, the marketplace repository 202 is further used to keep track of existing connections between data producers and data consumers.

The customer profile repository 204 stores general information about the organizations operating the IoT networks ("IoT profile data"), as may be supplied to the data-brokerage server 102, for instance, during registration, and as may be used, in particular, for discerning trends in and/or predicting the data needs of organizations. The customer profile repository 204 may, for example, store, for each IoT network, the industry to which the owner/operator organization belongs (e.g., energy generation, energy distribution, home security systems, transportation, manufacturing, government), the geographic region associated with the organization (e.g., a country or city), the size of the organization (e.g., the number of employees, the number of its customers, or financial information such as yearly revenue or the total value of its assets), the rating given to it by consumers, and/or information about the types of IoT devices it operates and/or the type of data it obtains (e.g., regular time-series data vs. event data, computing metrics vs. physical parameters). It will be appreciated that, although the marketplace repository 202 and the customer profile repository 204 are depicted as separate entities and serve different primary purposes, they may overlap in the kinds of data they store and may, in some embodiments, be integrated in a single database or repository.

The data-brokerage service 118 accesses the marketplace repository 202 to facilitate connecting data producers and data consumers. In the depicted example embodiment, the data-brokerage service 118 includes various sub-modules. A communication module 210 serves to establish connections and orchestrate information exchange with the IoT platforms. The communication module 210 may be configured to, e.g., receive presence indications from the IoT platforms and metadata about data streams from data producers, send security tokens and producer/consumer configurations to the IoT platforms, and serve user interfaces to the IoT platforms. A user-interface module 212 generates user interfaces to present information to and/or solicit information from human platform users/operators. The user interfaces may include, for example and without limitation, a registration interface through which an organization can sign up with the data-brokerage service 118, a search interface allowing a data consumer to search for data streams of interest (e.g., by entering search tokens for a free-form search or filling in a structured search form) or to browse available data (e.g., using one or more drop-down menus that organize data streams by industry and/or data type), a consumer configuration interface in which a data consumer can select data streams and/or data fields within streams from among available data streams and fields (e.g., retrieved based on a search performed by the consumer and/or recommended based on an analysis of the consumer's profile), and/or a transaction interface communicating pricing terms, implementing auctions, and the like. Information received by the data-brokerage service 118 via the user interfaces and/or automatically through the communication module 210 may be used to populate the marketplace and customer profile repositories 202, 204. For example, profile data received for an IoT platform during registration may be written to the customer profiles repository 204, and metadata about available or desired data streams may be recorded in the marketplace repository 202. Conversely, the data-brokerage service 118 may read data stored in the marketplace repository 202 (and, in some embodiments, the customer profiles repository 204), e.g., by a search engine 214, to identify pairs of data consumers and data producers, which may then be presented as search results in a user interface.

The data-brokerage service 118 further includes a configuration creator 216 to generate producer and consumer configurations 124, 126 based on the selections of data streams and data fields provided by the operator of the data-consumer IoT platform via, e.g., the consumer configuration interface. The producer configurations 124 specify, for each data consumer, the data fields the data consumer wants to receive, allowing the data producers receiving the producer configurations 124 to filter their data streams prior to data transfer to data consumers, thereby conserving bandwidth. The producer configurations 124 may also include further information about the data needs of the data consumers. For example, a data consumer may specify a lower data rate than is available from a data producer, and based on inclusion of that lower rate in the producer configuration 124, the data producer can down-sample the data stream prior to transmission via a P2P connection. The consumer configuration 126 for each data consumer identifies the data producers that will send data streams, and maps the data fields included within the transmitted data streams to data fields within a target data stream to be generated by the agent application 116 of the data consumer. The consumer configuration 126 may also include instructions, for execution by the agent application 116 of the data consumer, for converting the format of the incoming data and/or temporally aligning incoming data streams of different data rates. Alternatively to causing data reformatting and/or alignment consumer-side, information and/or instructions enabling the data producer to perform these operations may be included in the producer configuration(s) 124. The data-brokerage service 118 may also distribute a unified data model to the IoT platforms for use by the agent applications 116 to conform incoming and/or outgoing data to the model.

In accordance with various embodiments, the recommendation engine 200 analyzes the data needs of data consumers in conjunction with their stored customer profiles and/or otherwise available information about the respective organizations to discern correlations between groups of data consumers and the types of data they are interested in. Groups of consumers may be defined, e.g., in terms of industries or geographic regions of operation (or any other criteria that can be evaluated based on the customer profiles or other information about the organizations). It is to be expected that, for example, organizations operating within the same general industry generally request similar types of data and combinations thereof. A general understanding of data usage tendencies across IoT platforms allows the recommendation engine 200 to determine combinations of specified data fields that are commonly used together. These combinations may include data fields from multiple data streams provided by multiple data producers, and may be offered to data consumers that may be interested in them as a package, obviating the need for data consumers to go through the effort of creating the combination on their own. Of course, a pre-computed combination of data fields, possibly aggregated across data streams from multiple producers, as provided by the recommendation engine 200 and displayed, e.g., via a suitable user interface need not necessarily be accepted by a user of the data-consumer IoT platform in its entirety, but may be further customized with manual selections. Thus, for instance, upon sign-up of a new organization with the data-brokerage service 118, the recommendation engine 200 may determine a group of organizations to which the new organization belongs or otherwise identify similar organizations among the existing customers of the data-brokerage service 118, and retrieve or assemble a custom data package of available date streams and data fields that the new organization may be interested in receiving. Metadata about the data fields within a recommended package may then be displayed, along with user-interface elements (such as, e.g., check boxes) allowing a consumer-side user reviewing the recommendation to select or unselect each individual item, or adopt the recommendation without modification. Based on the selection received in this or a similar manner from the data consumer, the configuration creator can generate corresponding consumer and producer configurations. Of course, recommendations of data packages may also be made to existing data consumers, e.g., as new data streams become available.

As will be appreciated by those of ordinary skill in the art, the organization of the overall functionality of the data-brokerage server 102 into various modules is by way of example only, and other ways of grouping the described functionality are possible.

Figure 3:
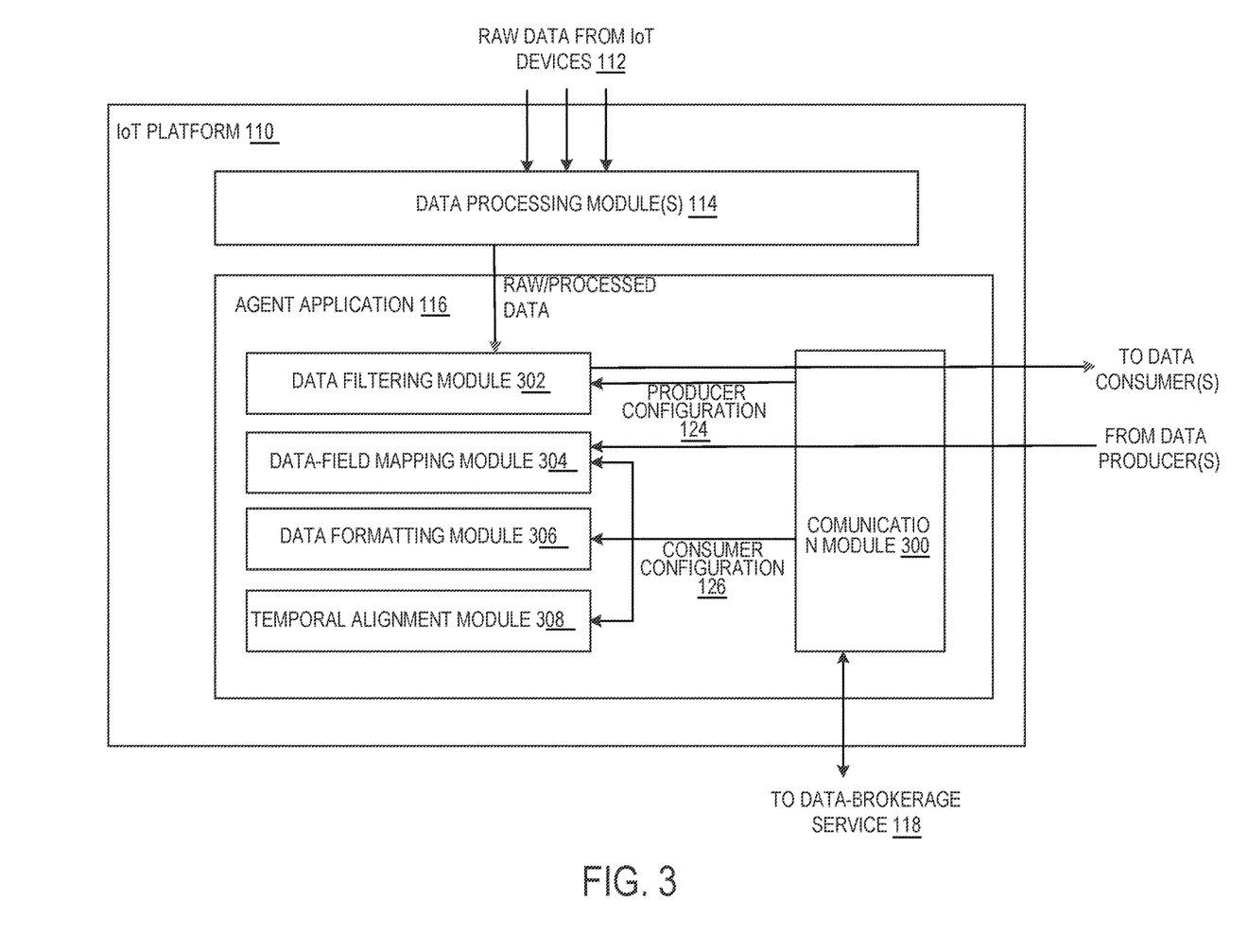
FIG. 3 is a block diagram of an IoT platform in accordance with an example embodiment.

Turning now to the data consumer, FIG. 3 is a block diagram of an IoT platform 110 in accordance with an example embodiment. The IoT platform 110, which may be implemented by one or more computers, includes one or more data processing modules 114 for processing the raw data received from the IoT devices 112 within the IoT network, and an agent application 116 facilitating data exchange with other IoT platforms 110 via P2P connections as brokered by the data-brokerage service 118. The data processing module(s) 114 and agent application 116 may be implemented by one or more processors executing program code stored in memory. The IoT platform may further include one or more data storage devices for temporarily or permanently storing raw and/or processed IoT data. To enable communications with the data-brokerage server 102 and other IoT platforms, the IoT platform 110 includes a network interface (or multiple such interfaces on multiple computers collectively constituting the IoT platform 110.)

The data processing modules 114 may condition, filter, aggregate, average, and/or resample incoming raw data streams (e.g., to remove noise or outliers or otherwise improve the data quality). Furthermore, the data processing modules 114 may analyze and process the data to derive new quantities of interest. Raw data and/or processed data may be passed on to the agent application 116 for streaming to other IoT platforms. Conversely, data streams received at the agent application 116 from other IoT platforms may be forwarded to the data processing module(s) 114 for processing and analysis, or stored in permanent storage of the IoT platform 110 for future use. The IoT platform 110 may also expose an application programming interface (API) allowing third-party vendors to provide additional processing or analysis capabilities, e.g., via plug-ins.

The agent application 116 may include various sub-modules to provide functionalities used by the IoT platform 110 when acting as data producer and/or data consumer. A communication module 300 enables communications with the data-brokerage server 102 (e.g., to provide metadata about data streams made available by the IoT platform and data it is interested in receiving, as well as to receive producer/consumer configurations, security tokens, etc.) and establishes P2P connections with other IoT platforms. Via the communication module 300, the raw and/or processed data acquired by the IoT platform 110 can be streamed to one or more data consumers. Prior to transmission of the data stream, a data-filtering module 302 may, based on one or more producer configurations 124 received from the data-brokerage service 118, filter the default data stream provided by the IoT platform 110 to create custom data streams that include only data fields of interest to the data consumers. The data-filtering module 302 may also filter out personal identifiable information or other specified information that ought not be shared (e.g., for the protection of producer confidential information, and/or compliance with privacy laws or other regulations).

When the IoT platform 110 acts in a consumer capacity, incoming data streams received via the communication module 300 may be channeled to a data-field mapping module 304, which can aggregate data fields across multiple data streams to generate a single target data stream, based on a consumer configuration provided by the data-brokerage service 118. The data-field mapping module 304 may operate in conjunction with data formatting and temporal alignment modules 306, 308, which may likewise utilize information provided in the consumer configuration. The data-formatting module 306 may, for instance, perform unit conversions (e.g., convert energy metrics from kWh to Joules, or temperature data from Fahrenheit to Celsius), data-type conversions (e.g., reducing a numerical precision of the incoming data or converting numbers to strings), or conform the incoming data in some other manner to the desired format of the target data stream.

The temporal alignment module 308 serves to ensure that data fields within the target data stream share a common data rate and are consistent (within feasible limits) in the points in time to which each data sample belongs, despite potentially different data rates and/or nonsynchronous acquisition times of the incoming data. To facilitate accurate comparisons of the measurement times associated with the data, the data producers may all be synchronized with a clock of the data-brokerage server 102, such that time stamps included in the streamed data are expressed within the same reference time frame. Alternatively, if time stamps that are based on the internal clocks of the data producers (which may differ from producer to producer) are transmitted, the time off-sets between the internal clocks and the data-brokerage server clock may be communicated to the data consumers to enable time corrections. Knowledge of the exact time when data was acquired does, of course, not affect the acquisition times, and therefore does not solve the problem of inconsistent timing of different data streams. The temporal-alignment module may, therefore, process (e.g., interpolate) the incoming data based on suitable heuristics to achieve better temporal alignment where possible. Consider, for example, two data streams each including samples acquired at a rate of one per minute. If the samples of the first data stream are taken at the beginning of each minute and the samples of the second data stream are taken thirty seconds into each minute, the two data streams are out of synch despite equal data rates. For slowly varying data (e.g., environmental temperature data), however, alignment can be achieved by averaging each pair of successive samples in the second data stream to obtain a reasonable approximation of the actual value that would be measured in between (e.g., at the beginning of each minute). Similarly, for data streams that are off-set relative to each other by any fraction of the time interval between samples, a weighted average of pairs of successive samples can be computed (with a greater weight being given to the data sample that is closer in time to the target time) to properly interpolate. Alternatively, data values of the second data streams at given points in time (e.g., corresponding to the points in time at which the samples in the first data stream are taken) can be obtained from a computational fit to two or more successive samples surrounding each point in time. Further, to convert data streams with different data rates into a uniform target data stream, one or more of the incoming data streams may be down-sampled, e.g., based on the smallest data rate or on the smallest common multiple of all sampling intervals. Two data streams having data rates of three samples per second and two samples per second, respectively, may both be down-sampled to one sample per second. Down-sampling may be used in conjunction with interpolation/averaging to achieve temporal alignment. Interpolation can, in principle also be used to increase the data rate, compared with that of the incoming data stream.

While, in FIG. 3, the data-filtering module 302 is depicted as a producer module and the data formatting module 306 and temporal alignment module 308 are depicted as consumer modules, it will be appreciated by those of ordinary skill in the art that data filtering can also be implemented consumer-side and data formatting and/or temporal alignment can also be performed producer-side. Further, the organization of the overall functionality of the agent application 116 into various modules is by way of example only, other ways of grouping the described functionality being possible.

Figure 4:
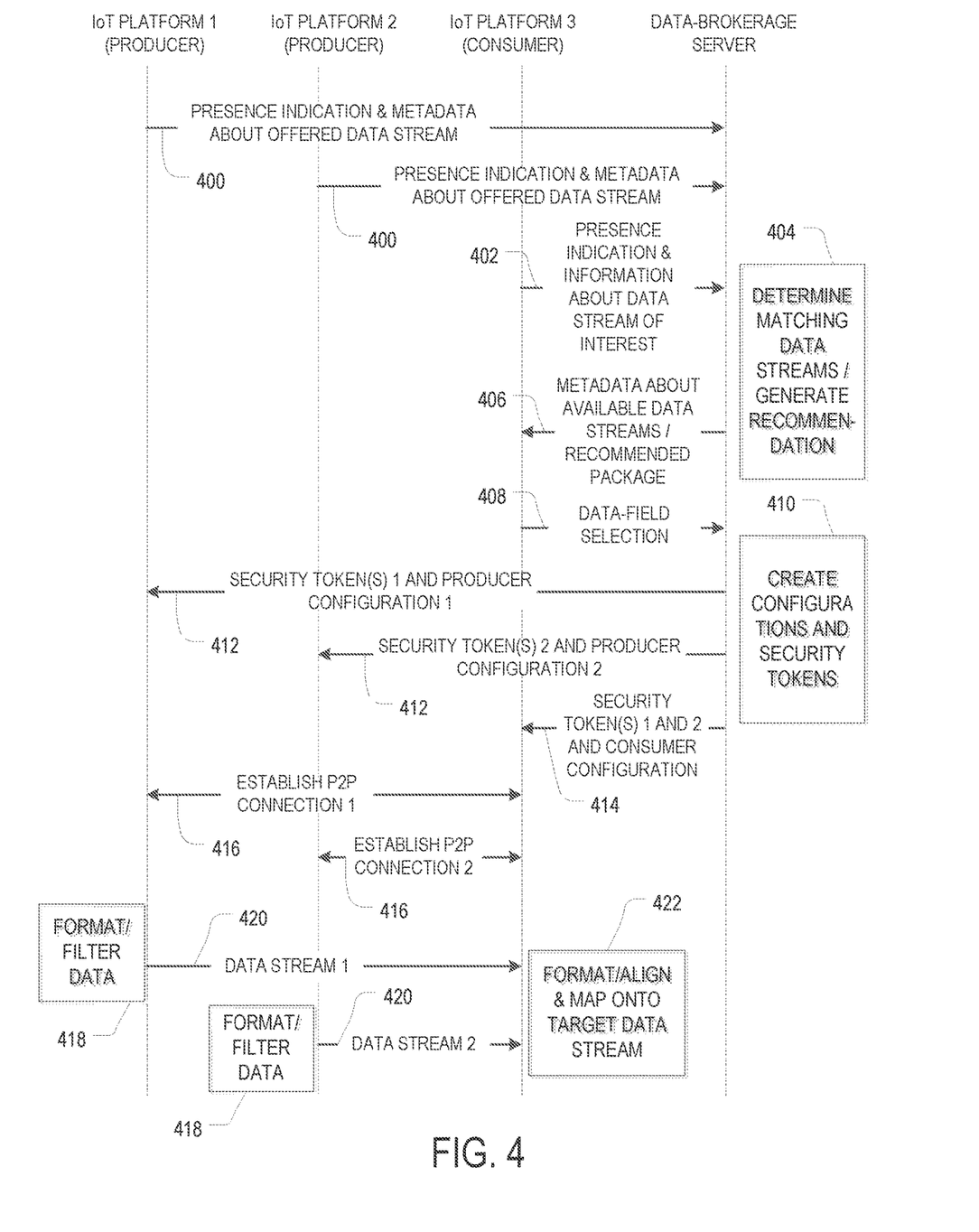
FIG. 4 is a diagram of an example process for sharing data between IoT platforms, in accordance with various embodiments.

FIG. 4 is a diagram of an example process for sharing data between IoT platforms, in accordance with various embodiments. To illustrate the combination of data fields from multiple data producers across data streams, the process is shown for two data producers (IoT platforms 1 and 2) and a data consumer (IoT platform 3). In accordance herewith, data sharing is facilitated by a data-brokerage server that communicates with each of the IoT platforms 1, 2, and 3. The process begins with IoT platforms 1 and 2 indicating their presence to the data-brokerage server as well as sending metadata about the data streams they are offering (for purchase or for free) to other IoT platforms (act 400), and IoT platform 3 likewise indicating its presence to the data-brokerage server and specifying the kinds of data streams it is interested in (act 402). The presence indication of any one of the three platforms may involve, in some instances, registering with the data-brokerage server and/or transmitting customer-profile information. Further, each of acts 400, 402 may include a series of communications. For example, following initial, one-time registration with the data-brokerage server, each platform may send multiple subsequent communications, e.g., to indicate its presence when coming back online after temporary disconnection, or to update the metadata/information about the data streams it provides or is interested in.

In response to receipt of information about the data that IoT platform 3, acting as data consumer, is interested in, the data-brokerage server determines data streams that match the data consumer's interest (act 404). In some embodiments, this determination involves generating, based on a customer profile of IoT platform 3, a recommendation for a data package including data fields from multiple data streams. The data-brokerage server then sends metadata about the available data streams and/or the recommended data package to IoT platform 3 (act 406), which returns its selection of data fields, e.g., by accepting the recommended package or further customizing it (act 408). Based on the selected data fields, which may (and, in the depicted example, do) belong to data streams from multiple data producers, the data-brokerage server creates producer and consumer configurations (as described above) and generates security tokens to facilitate secure P2P connections between the IoT platforms (act 410). A first security token (or set of tokens) and a first producer configuration are sent to IoT platform 1, and a second security token (or set of tokens) and a second producer configuration are sent to IoT platform 2 (act 412). Further, both (sets of) security tokens (or complementary tokens that act in conjunction with tokens 1 and 2, respectively) and the consumer configuration are sent to IoT platform 3 (act 414). Using the security tokens, P2P connections are then established between IoT platform 1 (as data producer) and IoT platform 3 (as data consumer) and between IoT platform 2 (as data producer) and IoT platform 3 (as data consumer) (act 416). Based on their respective producer configurations, IoT platforms 1 and 2 can format and/or filter the data streams they offer (e.g., by generating sub-streams that include only the data fields selected by IoT platform 3) (act 418), and send the formatted/filtered data as data streams 1 and 2 to IoT platform 3 via the P2P connections (act 420). At IoT platform 3, the received data streams are mapped to a single target data stream and, optionally, formatted and/or temporally aligned in accordance with the consumer configuration (act 422).

Figure 5:
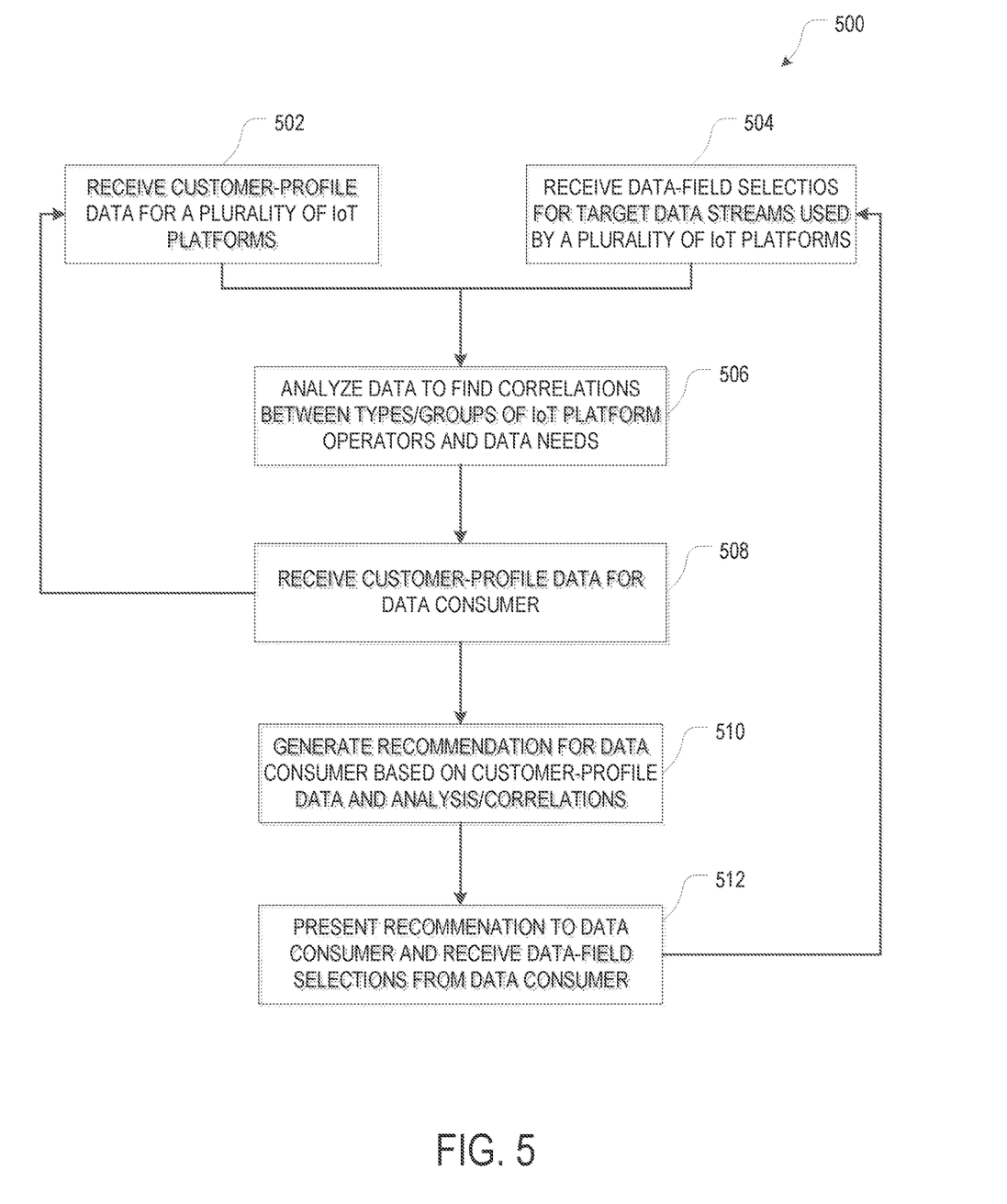
FIG. 5 is a flow chart of a method for generating data-package recommendations, in accordance with various embodiments.

FIG. 5 is a flow chart of a method 500 for generating data-package recommendations, in accordance with various embodiments. The method 500 involves receiving customer-profile data for a plurality of IoT platforms (act 502) as well as selections of data fields, often involving multiple data streams from multiple data producers, that are mapped into target data streams used by the various IoT platforms (act 504). These two types of data—customer profiles and the data-field selections in the target data streams—are analyzed in conjunction to find correlations between types or groups of organizations owning and/or operating IoT platforms and their respective data needs (act 506). Upon receipt of customer-profile data for a particular (e.g., new) data consumer (act 508), this analysis and/or the discovered correlations are then used to generate a recommendation of a data package for the data consumer (act 510). In a simple case, the recommended data package may include a combination of data fields that is commonly used by data consumers within the group to which the new data consumer belongs (as determined, e.g., based on its customer-profile data). In a more sophisticated case, the recommended data package may be constructed from multiple data-field combinations used by different groups of data consumers that have certain characteristics in common with the data consumer that is to receive the recommendation. The recommendation is then presented to the data consumer for acceptance and/or further tailoring, and a corresponding selection of data fields is received from the data consumer (act 512). The customer-profile data and data-field selections of the data consumer may be fed back into the analysis for use in future recommendations.

A system according to one example embodiment includes a data-brokerage service executing on a server that includes one or more processors and is communicatively coupled to at least one data-consumer platform and to a plurality of data-producer platforms providing a plurality of respective data streams. The data-brokerage service is configured to perform operations including: receiving, from the at least one data-consumer platform, a selection of data fields included in the plurality of data streams; and, responsive to the selection, causing the plurality of data-producer platforms to stream at least the selected data fields of the plurality of data streams to the at least one data-consumer platform, and causing the at least one data-consumer platform to combine the streamed data fields received from the plurality of data-producer platforms into a single target data stream. The system may further include an agent application executing on the data-consumer platform and configured to map the selected data fields received from the plurality of data-producer platforms onto the target data stream based on a consumer configuration received from the data-brokerage service. The agent application may be further configured to temporally align the selected data fields received from the plurality of data-producer platforms by executing alignment instructions included in the consumer configuration, and/or to convert a format of the selected data fields received from the plurality of data-producer platforms by executing formatting instructions included in the consumer configuration. Furthermore, the system may include a plurality of agent applications executing on the plurality of data-producer platforms and configured to filter the respective data streams provided by the plurality of data producers based on a plurality of respective producer configurations received from the data-brokerage service, the producer configurations identifying the at least one data consumer and the selected data fields. The data-brokerage service may include a search engine configured to identify data streams, among the plurality of data streams, that match data interests communicated to the data-brokerage service by the data-consumer platform, and the data-brokerage service may present metadata about the identified data streams to the data-consumer platform; the selection of data fields may be received in response to the presenting of the metadata. The system may also include a recommendation engine executing on the server, the recommendation configured to analyze consumer-profile data and target data streams associated with a plurality of data-consumer platforms, and recommend data fields to the at least one data-consumer platform based on the analysis in conjunction with customer-profile data associated with the at least one data-consumer platform; the selection of data fields may be received in response to the recommendation. The system may further include, stored on the server, a marketplace repository storing metadata about the plurality of data streams.

A method according to one example embodiment includes, by a data-brokerage server communicatively coupled to at least one data-consumer platform and to a plurality of data-producer platforms providing a plurality of respective data streams, receiving a selection of data fields included in the plurality of data streams from the at least one data-consumer platform; and, responsive to the selection, causing the plurality of data-producer platforms to stream at least the selected data fields of the plurality of data streams to the data-consumer platform, and causing the data-consumer platform to combine the streamed data fields received from the plurality of data-producer platforms into a single target data stream. The may further include, by the data-brokerage server, presenting metadata for the plurality of data streams and the data fields included therein to the data-consumer platform, the selection of data fields being received in response to the presenting. The method may also involve, by the data-brokerage server, analyzing consumer-profile data and target data streams associated with a plurality of data-consumer platforms, and recommending data fields to the at least one data-consumer platform based on the analysis in conjunction with customer-profile data associated with the at least one data-consumer platform, the selection of data fields being received in response to the recommendation. Causing the plurality of the data-producer platforms to stream at least the selected data fields to the at least one data-consumer platform may include creating and transmitting producer configurations to the respective data-producer platforms, each producer configuration identifying the at least one data-consumer platform and the selected data fields. Causing the data-consumer platform to combine the streamed data fields may include creating and transmitting a consumer configuration comprising a mapping between the selected data fields and the target data stream. Combining the streamed data fields received from the plurality of data-producer platforms may involve temporally aligning the streamed data fields in accordance with a data rate of the target data stream.

One or more tangible computer-readable media in accordance with one example embodiment store instructions to control the operation of one or more processors, the instructions, when executed by the one or more processors, causing the one or more processors to perform operations including receiving, at a data-brokerage server from a data-consumer platform communicatively coupled to the server, a selection of data fields included in a plurality of data streams provided by a plurality of respective data-producer platforms communicatively coupled to the server; and, responsive to the selection, causing the plurality of data-producer platforms to stream at least the selected data fields of the plurality of data streams to the data-consumer platform, and causing the data-consumer platform to combine the streamed data fields received from the plurality of data-producer platforms into a single target data stream. The operations may further include presenting metadata for the plurality of data streams and the data fields included therein to the data-consumer platform, the selection being received in response to the presenting. The operations may also include analyzing consumer-profile data and target data streams associated with a plurality of data-consumer platforms, and recommending data fields to the at least one data-consumer platform based on the analysis in conjunction with customer-profile data associated with the at least one data-consumer platform, the selection being received in response to the recommendation. The operation of causing the plurality of the data-producer platforms to stream at least the selected data fields to the at least one data-consumer platform may include the operations of creating and transmitting producer configurations to the respective data-producer platforms, each producer configuration identifying the at least one data-consumer platform and the selected data fields. The operation of causing the data-consumer platform to combine the streamed data fields may include the operations of creating and transmitting a consumer configuration comprising a mapping between the selected data fields and the target data stream. The consumer configuration may include instructions, to be executed by the data-consumer platform, for temporally aligning the streamed data fields in accordance with a data rate of the target data stream.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

FIG. 6 is a block diagram of a computer processing system 600 within which a set of instructions 624 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a PC, a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 600 includes a processor 602 (e.g., a central processing unit (CPU), a graphics processing unit (GPU), or both), a main memory 604, and a static memory 606, which communicate with each other via a bus 608. The computer processing system 600 may further include a video display 610 (e.g., a plasma display, a liquid crystal display (LCD), or a cathode ray tube (CRT)). The computer processing system 600 also includes an alphanumeric input device 612 (e.g., a keyboard), a cursor control device 614 (e.g., a mouse and/or touch screen), a drive unit 616, a signal generation device 618 (e.g., a speaker), and a network interface device 620.

The drive unit 616 includes a machine-readable medium 622 on which is stored one or more sets of instructions 624 and data structures embodying or utilized by any one or more of the methodologies or functions described herein. The instructions 624 may also reside, completely or at least partially, within the main memory 604, the static memory 606, and/or within the processor 602 during execution thereof by the computer processing system 600, the main memory 604, the static memory 606, and the processor 602 also constituting tangible machine-readable media 622.

The instructions 624 may further be transmitted or received over a network 626 via the network interface device 620 utilizing any one of a number of well-known transfer protocols (e.g., Hypertext Transfer Protocol).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding, or carrying a set of instructions 624 for execution by the computer and that cause the computer to perform any one or more of the methodologies of the present application, or that is capable of storing, encoding, or carrying data structures utilized by or associated with such a set of instructions 624. The term "machine-readable medium" shall accordingly be taken to include, but not be limited to, solid-state memories and optical and magnetic media.

While the embodiments of the invention(s) is (are) described with reference to various implementations and exploitations, it will be understood that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A system comprising:
one or more processors; and
a memory storing instructions that, when executed by the one or more processors, causes the system to perform operations comprising:
accessing a first information of a first device among a first group of devices, the first information indicating a characteristic shared by the first group of devices, the first information indicating a set of data fields that corresponds to the first group of devices;
accessing a second information of a second device among a second group of devices, the second information indicating that the characteristic is shared by the second group of devices; and
based on the characteristic being shared by the first and second groups of devices, recommending that the set of data fields that corresponds to the first group of devices be selected to correspond to the second device.

2. The system of claim 1, wherein the operations further comprise in response to an input that selects the recommended set of data fields to correspond to the second device, causing the second device to receive the selected set of data fields from each of a plurality of data providers and combine the received set of data fields into a target data stream.

3. The system of claim 2, wherein the causing of the second device to receive the selected set of data fields from each of the plurality of data providers includes providing configuration data to each of the plurality of data providers, the configuration data identifying the second device and specifying the corresponding set of data fields.

4. The system of claim 2, wherein the causing of the second device to combine the received set of data fields into the target data stream includes providing configuration data to the second device, the configuration data indicating a mapping of the set of data fields onto the target data stream.

5. The system of claim 2, wherein the causing of the second device to combine the received set of data fields into the target data stream includes providing configuration data to the second device, the configuration data indicating a format conversion between the set of data fields and the target data stream.

6. The system of claim 2, wherein the causing of the second device to combine the received set of data fields into the target data stream includes providing configuration data to the second device, the configuration data indicating a temporal alignment between the set of data fields and the target data stream.

7. The system of claim 1, further comprising a plurality of provider applications executing on the plurality of data providers and configuring the plurality of data providers to stream at least the selected set of data fields to the second device based on configuration data that identifies the second device and specifies the selected set of data fields.

8. The system of claim 1, further comprising a consumer application executing on the second device and configuring the second device to map the selected set of data fields received from each of the plurality of data providers onto the target data stream based on configuration data that indicates a mapping of the set of data fields onto the target data stream.

9. The system of claim 1, further comprising a consumer application executing on the second device and configuring the second device to perform a format conversion between the set of data fields and the target data stream based on configuration data that indicates the format conversion between the set of data fields and the target data stream.

10. The system of claim 1, further comprising a consumer application executing on the second device and configuring the second device to perform a temporal alignment between the set of data fields and the target data stream based on configuration data that indicates the temporal alignment between the set of data fields and the target data stream.

11. The system of claim 1, wherein:
the second information of the second device further indicates at least one of an industry of the second device or a geographic location of the second device; and
the recommending that the set of data fields be selected to correspond to the second device is further based on at least one of the industry of the second device or the geographic location of the second device.

12. The system of claim 1, wherein the first information comprises a first profile, and the second information comprises a second profile.

13. A method comprising:
accessing, by one or more processors of a machine, a first information of a first device among a first group of devices, the first information indicating a characteristic shared by the first group of devices, the first information indicating a set of data fields that corresponds to the first group of devices;
accessing, by one or more processors of a machine, a first information of a first device among a first group of devices, the first information indicating a characteristic shared by the first group of devices, the first information indicating a set of data fields that corresponds to the first group of devices;
accessing, by the one or more processors of the machine, a second information of a second device among a second group of devices, the second information indicating that the characteristic is shared by the second group of devices; and
by the one or more processors of the machine and based on the characteristic being shared by the first and second groups of devices, recommending that the set of data fields that corresponds to the first group of devices be selected to correspond to the second device.

14. The method of claim 13, wherein the operations further comprise, in response to an input that selects the recommended set of data fields to correspond to the second device, causing the second device to receive the selected set of data fields from each of a plurality of data providers and combine the received set of data fields into a target data stream.

15. The method of claim 14, wherein the causing of the second device to receive the selected set of data fields from each of the plurality of data providers includes providing configuration data to each of the plurality of data providers, the configuration data identifying the second device and specifying the corresponding set of data fields.

16. The method of claim 14, wherein the causing of the second device to combine the received set of data fields into the target data stream includes providing configuration data to the second device, the configuration data indicating a mapping of the set of data fields onto the target data stream.

17. The method of claim 14, wherein the causing of the second device to combine the received set of data fields into the target data stream includes providing configuration data to the second device, the configuration data indicating a format conversion between the set of data fields and the target data stream.

18. The method of claim 14, wherein the causing of the second device to combine the received set of data fields into the target data stream includes providing configuration data to the second device, the configuration data indicating a temporal alignment between the set of data fields and the target data stream.

19. The method of claim 13, further comprising providing a plurality of provider applications on the plurality of data providers, the plurality of provider applications configuring the plurality of data providers to stream at least the selected set of data fields to the second device based on configuration data that identifies the second device and specifies the selected set of data fields.

20. A non-transitory machine-readable medium comprising instructions that, when executed by one or more processors of a machine, cause the machine to perform operations comprising:
accessing a first information of a first device among a first group of devices, the first information indicating a characteristic shared by the first group of devices, the first information indicating a set of data fields that corresponds to the first group of devices;
accessing a second information of a second device among a second group of devices, the second information indicating that the characteristic is shared by the second group of devices; and
based on the characteristic being shared by the first and second groups of devices, recommending that the set of data fields that corresponds to the first group of devices be selected to correspond to the second device.

* * * * *